O. OHLSON.
PRESSURE GAGE.
APPLICATION FILED JUNE 5, 1916.
1,340,399.
Patented May 18, 1920.
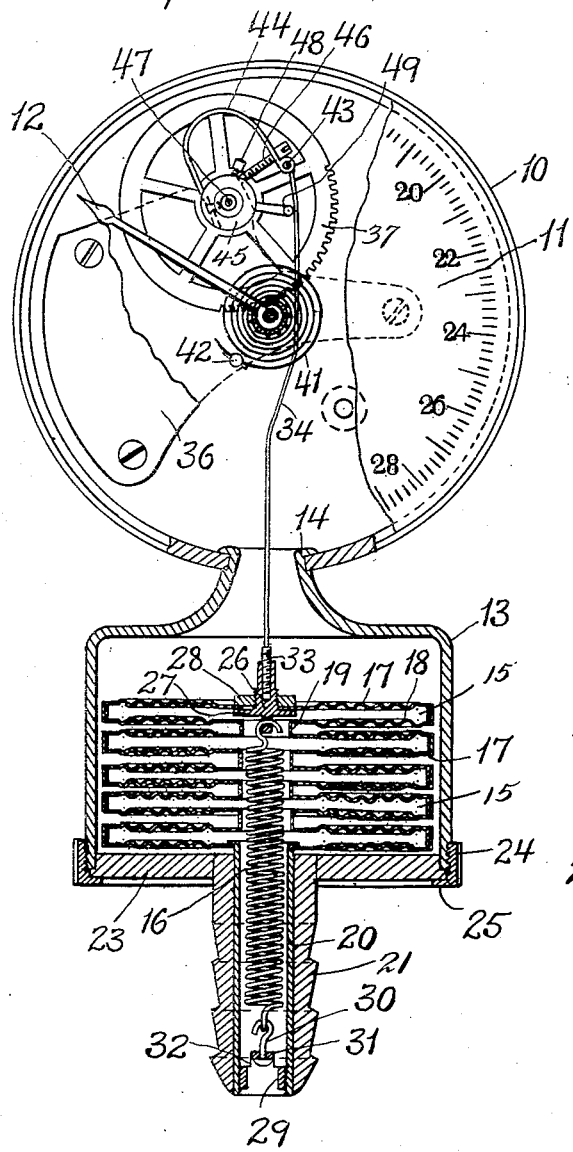
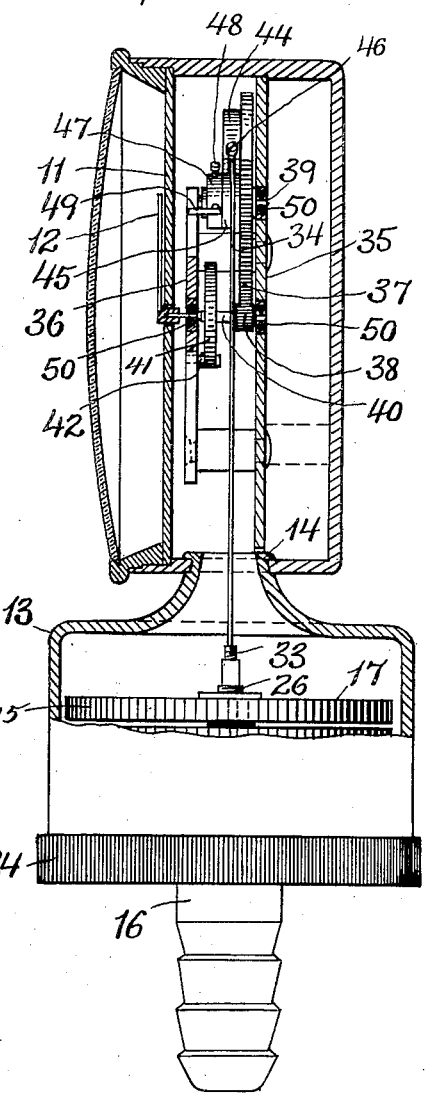
INVENTOR.
Olof Ohlson
ATT'YS.

UNITED STATES PATENT OFFICE.

OLOF OHLSON, OF WEST NEWTON, MASSACHUSETTS, ASSIGNOR TO WALTHAM WATCH COMPANY, OF WALTHAM, MASSACHUSETTS, A CORPORATION OF MASSACHUSETTS.

PRESSURE-GAGE.

1,340,399.        Specification of Letters Patent.      Patented May 18, 1920.

Application filed June 5, 1916. Serial No. 101,875.

*To all whom it may concern:*

Be it known that I, OLOF OHLSON, a citizen of the United States, residing at West Newton, in the county of Middlesex and State of Massachusetts, have invented new and useful Improvements in Pressure-Gages, of which the following is a specification.

The present invention relates to pressure gages and has particular reference to such gages adapted to measure and indicate with great accuracy relatively slight pressures and small variations of pressure. More particularly it has reference to gages of this sort adapted to be used in testing the blood pressure of persons. In consequence, therefore, for the purposes and uses for which my invention is particularly designed and adapted, it has been my object to provide in a pressure gage, certain refinements in construction of the operating parts or movement whereby increased accuracy may be obtained, and also to provide a new form of pressure measuring or weighing apparatus applicable not only to gages for the particular purpose above mentioned, but to pressure gages usable for other purposes as well. In this specification the term "weighing" apparatus is intended to cover that part of the instrument which receives fluid under pressure and is distorted or moved by the pressure of the contained fluid an amount proportional to such pressure. This weighing apparatus operates a pointer or indicator through a mechanism or movement which constitutes another part of the gage.

The particular feature in which the invention consists appears from the following specification and the claims appended thereto, in connection with the drawings which form a part of the application.

In the drawings—

Figure 1 is a front elevation partly in section and with parts broken away of the gage embodying my invention.

Fig. 2 is a cross section of the gage on a plane at right angles to the plane in which Fig. 1 is projected.

Both figures represent the particular gage illustrated on a scale larger than actual size.

The case or housing of the gage comprises a cylindrical box 10 which contains the movement and supports the dial 11 and indicating pointer or hand 12, and a second cylindrical box 13, the base of which is drawn out into a nipple 14 which is passed through a hole in the side of the box 10 and is headed over within the latter. Within the box 13 is contained the weighing mechanism which consists of a number of boxes or chambers 15 and a spring 16. The chambers are constructed of thin disks or diaphragms 17, 18 corrugated in concentric circles to increase their flexibility, flanged to overlap one another at their peripheries and there soldered together. There are several of such chambers in each gage, one diaphragm wall, 17 for instance, of each chamber except the innermost one, being connected to the adjacent diaphragm 18 of the next chamber by an outwardly turned flange 19 near its center which is passed through a central hole of the diaphragm 18 and is soldered thereto. In place of soldering any other means for hermetically sealing the diaphragms to one another may be employed. It will be seen that the diaphragms are connected to one another alternately at their peripheries and at their centers and the interiors of all the chambers constituted by the several pairs of peripherally connected diaphragms are in communication in series through the central apertures. The diaphragm 18 of the chamber at one end of the series is similarly connected to a tube 20 which passes through and is soldered to the interior of a tubular stem 21 which forms part of a plate 23 constituting the detachable end wall of the box 13, which is secured in place by a holding ring 24 threaded on the end of the box and having a flange or lip 25. The tube or nipple 21 is adapted to be connected with a pipe or conduit of any sort through which any fluid under pressure may be conducted to the expansion chambers 15.

Attached to the diaphragm 17 of the innermost expansion chamber is a coupling 26 which passes through the diaphragm 17, and has a flange 27 inside the chamber and holds a nut 28 outside of the chamber between which and the flange 27 the diaphragm is clamped. That part of the coupling 26 which is contained inside of the expansion chamber constitutes an anchorage for one end of the spring 16, having an eye through which the hook shaped end of the spring passes. The other end of the spring is anchored to an abutment which consists of a sleeve or cup 29 screwed into the threaded outer end of the tube 20, and a hook 30 swiveled in the end wall or yoke 31 of the cup. The sides of the cup adjacent to the end wall thereof are cut away at 32 to provide passages through which air or other fluid may flow freely to the expansion chambers 15.

The chambers 15 and spring 16 constitute weighing mechanism by which the pressure of the fluid contained in the chambers 15 is measured. When fluid under pressure greater than atmospheric, or whatever other external pressure may be acting on the gage, is admitted to the expansion chambers, the effect is to expand them and move the innermost wall 17 away from the rigid fixed end wall 23, thereby applying stress to the spring, which resists such movement. The spring may be accurately made of material having a regular known resistance to distortion, whereby it affords an exact measure of the pressures acting. It may be regulated and adjusted to a high degree of accuracy by screwing the cup 29 in or out, the swiveled hook or shackle 30 permitting the cup to turn without bending or turning the spring.

That part of the coupling 26 which projects from the weighing apparatus is internally threaded and receives the threaded end 33 of a link 34 which transmits motion from the weighing apparatus to the movement of the gage. Such movement comprises a back plate 35, a front plate or bridge 36, a wheel 37, and a pinion 38, the staffs 39 and 40 of which are mounted in bearings in the plates. The staff 40 of the pinion 38 has one of its pivots extended far enough beyond the bridge 36 to receive the sleeve of the pointer 12 and hold the latter. A hairspring 41 is connected at one end to the staff 40 and the other end to a stud 42 which is fixed in the bridge 36. The function of the hairspring is to take up backlash between the pinion 38 and wheel 37.

The wheel 37 need be provided with teeth through only a part of its peripheral extent, since it need not move through more than a comparatively small distance to move the pointer entirely around the dial, and besides, the means for transmitting motion from the weighing mechanism to the wheel 37 is incapable of turning the wheel through more than a part of a revolution.

The connection between the link 34 and wheel 37 is made by a pivot pin 43 which is held in one end of a bowed spring 44, the other end of which is rigidly attached to the hub 45 of the wheel. A screw 46 passes through the spring and is threaded into the hub 45, its head bearing on the outer side of the spring. That part of the spring which holds the pivot pin 43 is curled over to grip such pin and is slotted to receive the end of the link 34. Thus the latter bears on the middle part of the pin 43, the two ends of which are held in firm bearings.

A collar 47 is secured on the staff of the wheel 37 by a set screw 48 and carries a stop arm 49 adapted to strike the bridge 36 to limit the oscillation of wheel 37. This stop is bent up so that its end crosses the plane of the bridge, or at least of the under surface of the bridge.

By adjusting the position of the pivot pin 43 in or out the throw of the pointer for given extents of movement of the weighing mechanism may be altered, and thereby brought into accurate relation to the scale on the dial representing pressures. By screwing the link 34 more or less into or out of the coupling 26, the position of the pointer may be altered without affecting its amplitude of swing, in order to bring it accurately to the zero position when there is no pressure acting on the weighing mechanism, or to place it in any given position corresponding to a given distortion of the weighing mechanism.

The pivots of the wheel 37 and pinion 38 are mounted in jewel bearings 50 which allow the movement to function with the minimum of frictional resistance and backlash and the maximum of accuracy. The principles above described may be applied in small gages dealing with small pressures with the effect of obtaining exceedingly accurate indications. I have incorporated these principles in a gage which indicates in terms of a column of mercury, the height of which is measured in centimeters, on a scale whereof the unit graduations are from twelve to fifteen hundredths of an inch apart. Sub-divisions of the scale enable readings to be made in terms of millimeters of mercury, and the delicacy of the instrument, made possible by the adjustments and the jewel bearings hereinbefore described is so great that it is accurate to the last degree in which reading of the indications is possible.

What I claim and desire to secure by Letters Patent is:

1. A pressure gage comprising a weighing mechanism consisting of an expansible container for fluid under pressure one wall of which is fixed in position and has an inlet, and an opposite wall of which is movable, and a spring passing through said inlet and connected to said movable wall to resist expansion of said container, an indicator, an anchorage to which the end of the spring outside of the container is secured, and transmision means between said indicator and weighing mechanism movable by expansions and contractions of said mechanism.

2. A pressure gage comprising a number of chambers adapted to contain fluid under pressure connected together in series and in communication, the walls of said chambers being movable by the pressure of the contained fluid, a spring anchored at one end, passing through the series of chambers, and connected at its opposite end to the outer wall of the last chamber of the series for resisting yieldingly the pressure-induced movement thereof, an indicator, and pressure transmitting mechanism between said movable wall and said indicator for moving the latter in response to movements of said wall.

3. A pressure gage for measuring slight pressure and variations thereof, comprising a series of diaphragms connected alternately at their peripheries and centers and having internal communication through their central connections, a rigid base to which the diaphragm at one end of the series is secured, a helical spring secured at one end to said base and at its opposite end to the diaphragm at the opposite end of the series, whereby movement of the diaphragms in consequence of increased internal pressure elongates said spring, an indicator, and connections for transmitting movement from the last-named diaphragm to said indicator.

4. A pressure gage comprising a weighing mechanism, a connecting rod joined to said weighing mechanism, a wheel pivoted to said connecting rod, a bowed spring holder secured to the wheel carrying the pivot for said rod, adjusting means for bending said holder more or less to alter the distance of such pivot from the axis of the wheel, a staff carrying a pinion geared to said wheel to be rotated thereby, and a pointer operated by the staff.

5. A weighing mechanism comprising an expansible chamber having an inlet for admitting fluid under pressure, a spring connected to a wall of said chamber for resisting the expansion thereof passing through said inlet, and an adjustable anchorage or abutment for the spring comprising a screw-threaded cup and a hook swiveled to said cup and engaged with the spring, said anchorage adapted to be adjusted for varying the yielding resistance which the spring opposes to the expansion of said chamber, an indicator and mechanism operated by said movable wall for moving the indicator.

6. In a pressure gage, a weighing mechanism comprising a series of disks connected with one another in alternation peripherally and centrally, thereby forming a series of axially arranged and centrally connected boxes or chambers, having communication with one another through their central connections, a helical spring passing through the communicating passages of said boxes and being connected to the disk which forms the outer wall of the endmost box, a support for the disk at the opposite end of the series, a tube for conducting fluid into said weighing mechanism, and an anchorage for the opposite end of said spring secured in said tube.

7. In a pressure gage, a weighing mechanism comprising a series of disks connected with one another in alternation peripherally and centrally thereby forming a series of axially arranged and centrally connected boxes or chambers, having communication with one another through their central connections, a helical spring passing through the communicating passages of said boxes and being connected to the disk which forms the outer wall of the endmost box, a support for the disk at the opposite end of the series, a tube for conducting fluid into said weighing mechanism, and an anchorage for the opposite end of said spring secured in said tube, said anchorage comprising a sleeve or cup screwed into the threaded interior of the tube in an adjustable manner and having a through passage for fluid.

8. A pressure gage comprising an expansible chamber, a support to which one wall of said chamber is secured, the opposite wall of the chamber being movable under the pressure of fluid admitted to the chamber, a coupling passing through said opposite end wall and secured thereto, a spring attached at one end to that part of the coupling which lies within the chamber, and being anchored at its other end in a fixed manner, the part of said coupling external to the chamber being threaded, a link secured adjustably on said threaded part of the coupling, a movement to which said link is connected, and an indicator operated by said movement.

9. A pressure gage comprising an expansible chamber, a support to which one wall of said chamber is secured, the opposite wall of the chamber being movable under the pressure of fluid admitted to the chamber, a coupling passing through said opposite end wall and secured thereto, a spring attached at one end to that part of the coupling which lies within the chamber, and being anchored at its other end in a fixed manner, the part of said coupling external to the chamber being threaded, a link screwed adjustably on said threaded part of the coupling, an indicator operating movement comprising a staff to which an indicator is applied, a pinion on said staff, and a wheel meshing with said pinion, the link being connected to said wheel through a bowed pivot-carrying spring fixed at one end to the wheel, and means for bending said spring more or less to shift said pivot toward and away from the axis of the wheel.

In testimony whereof I have affixed my signature.

OLOF OHLSON.